United States Patent [19]

Lau

[11] Patent Number: 4,609,044

[45] Date of Patent: Sep. 2, 1986

[54] ALKALI-ENHANCED STEAM FOAM OIL RECOVERY PROCESS

[75] Inventor: Hon C. Lau, Houston, Tex.

[73] Assignee: Shell Oil Company, Houston, Tex.

[21] Appl. No.: 736,008

[22] Filed: May 20, 1985

[51] Int. Cl.$^4$ ............................................. E21B 43/24
[52] U.S. Cl. .................... 166/270; 166/272; 166/274; 166/303
[58] Field of Search ............... 166/272, 275, 270, 274, 166/252, 309, 303

[56] References Cited

U.S. PATENT DOCUMENTS

| | | | |
|---|---|---|---|
| 3,927,716 | 12/1975 | Burdyn et al. | 166/270 |
| 3,945,437 | 3/1976 | Chiu et al. | 166/275 X |
| 4,086,964 | 5/1978 | Dilgren et al. | 166/252 X |
| 4,232,737 | 11/1980 | Tyler et al. | 166/274 X |
| 4,269,271 | 5/1981 | Shupe et al. | 166/274 |
| 4,330,418 | 5/1982 | Glinsmann et al. | 166/275 X |
| 4,393,937 | 7/1983 | Dilgren et al. | 166/272 |
| 4,502,541 | 3/1985 | Lawson et al. | 166/275 |
| 4,532,993 | 8/1985 | Dilgren et al. | 166/309 X |

*Primary Examiner*—Stephen J. Novosad

[57] ABSTRACT

In a continuous or cyclic steam foam drive, recovery of an acidic reservoir oil is improved by injecting steam accompanied by (a) enough dissolved alkaline monovalent salt to ion-exchange multivalent cations from the reservoir rocks and precipitate those ions in compounds which are insoluble in an alkaline aqueous liquid as well as forming soaps of the reservoir oil acids and (b) surfactants for foaming the steam and increasing the salt tolerance of an aqueous surfactant system containing the soaps of the reservoir oil acids.

9 Claims, 1 Drawing Figure

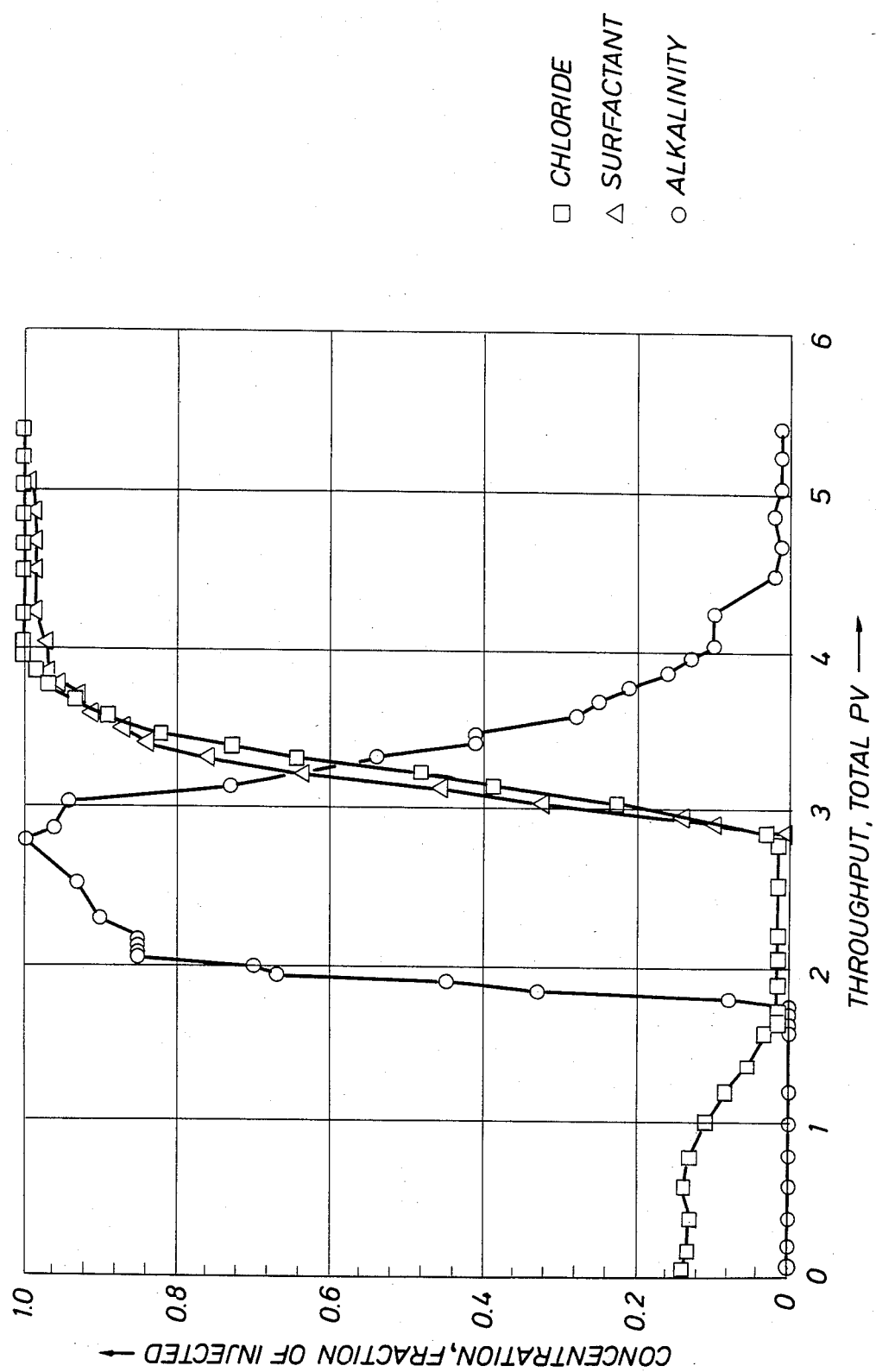

ALKALI-ENHANCED STEAM FOAM OIL RECOVERY PROCESS

BACKGROUND OF THE INVENTION

The invention relates to a steam foam process for producing a relatively low gravity acidic oil from a subterranean reservoir. More particularly, it relates to an alkali-enhanced steam foam drive or soak process for recovering such oil.

Numerous aqueous alkaline flood processes have been proposed, and various processes involving injecting an aqueous alkaline solution and various preformed surfactants have been described in U.S. patents, such as the following: U.S. Pat. No. 3,777,817 describes injecting an aqueous alkaline solution to satisfy the surfactant adsorption sites on the reservoir rock and then injecting a surfactant-containing aqueous liquid which may also contain alkali. U.S. Pat. Nos. 3,804,171 and 3,847,823 describe injecting aqueous alkaline solutions containing overbased petroleum sulfonate surfactants which are formed by over-neutralizing petroleum hydrocarbon sulfonates. U.S. Pat. Nos. 3,977,470 and 4,004,638 describe injecting an aqueous alkaline solution followed by an aqueous alkaline solution which contains a preformed surfactant which can be substantially any hydrocarbon sulfonate and can be accompanied by polyphosphates and carbonates that enhance the oil displacing efficiency of the process. U.S. Pat. No. 4,099,569 describes a staged process for recovering oil from a subterranean reservoir by injecting a surfactant solution in which the concentration of the surfactant is increased as increasing amounts of the solution are injected, then injecting a drive fluid. U.S. Pat. No. 4,232,737 describes a staged injection of a highly saline aqueous petroleum sulfonate surfactant system containing a solubilizing amount of cosurfactant and decreasing the concentration of both the salt and surfactant in stages to provide a trailing-edge salinity which is suitable for a polymer thickened aqueous drive fluid. U.S. Pat. No. 4,502,541 by J. B. Lawson and D. R. Thigpen, describes a cosurfactant-aided aqueous alkaline oil recovery process in which an oil displacing fluid containing at least one each of dissolved alkaline material, a substantially neutral salt and a preformed cosurfactant is injected with a concentration gradient such that the initially injected portion of fluid contains a larger proportion of preformed cosurfactant than later injected portions.

Commonly assigned U.S. patent application Ser. No. 411,779, filed Aug. 26, 1982 by D. R. Thigpen, J. B. Lawson and R. C. Nelson (i.e., the "'779 application"), now abandoned, relates to recovering oil from an acidic oil reservoir by injecting an alkaline aqueous solution. In the process of the '779 application, the alkaline solution also contains a substantially neutral salt and a preformed cosurfactant. It uses a cosurfactant comprising at least one compound which is significantly soluble in both the aqueous solution and the reservoir oil while being more soluble in the aqueous solution (relative to its solubility in the reservoir oil) than are the petroleum acid soaps which can be formed from the reservoir oil. The cosurfactant solution is selected and its concentration is adjusted so that the injected solution has an alkalinity, salinity and preformed cosurfactant content such that the salinity of the surfactant system formed by the interaction of the injected solution and the reservoir oil is substantially optimum for minimizing interfacial tension between the oil and surfactant system. The disclosures of the '779 application are incorporated herein by reference.

As indicated in the '779 application, although prior processes in which preformed surfactants were included in injected aqueous liquid solutions were designed to improve the oil recovery efficiency of similar processes free of the preformed surfactants, a serious problem remained in either type of such prior processes. Whenever an aqueous alkaline solution is injected into an oil reservoir, some or all of the alkali may be consumed by chemical reactions other than the desired reaction of converting petroleum acids to surfactant soaps. For example, multivalent cations dissolved in the water in the reservoir and/or associated with clay or other reservoir rock material can rapidly consume alkali by forming and precipitating multivalent metal hydroxides or salts. In siliceous reservoirs significant proportions of alkali are consumed by dissolving silicon oxide and by forming alkali metal silicates, etc. Because of such side reactions, if the injected aqueous alkaline solution is dilute, the alkali will propagate slowly through the reservoir rocks. The frontal propagation rate is slow because, as each portion of the injected solution contacts fresh portions of rock, some or all of its alkali content may be consumed by the side reactions. This is repeated over and over, and thus, although the unreactive liquid components of the injected solution may move through the reservoir at the rate corresponding to the rate at which the solution was injected, the movement through the reservoir of the alkali may be much slower. For example, it is disclosed in SPE Paper No. 8995 by Bunge et al that, when an aqueous alkaline solution containing 0.44% sodium hydroxide and 1.0% sodium chloride was flowed through a core of Wilmington sand which initially contained 1.0% calcium chloride solution; more than two pore volumes of the aqueous alkaline solution had to be injected before any of the sodium hydroxide reached the outflow end of the core.

With respect to steam drive or soak processes for recovering oil, various uses of alkali have been proposed. Such proposals are contained in U.S. Patents such as the following. U.S. Pat. No. 3,853,178 suggests adding about 0.05 to 0.1 percent of alkali metal hydroxides to the liquid phase of steam to react with connate water (col. 2 line 67) or boiler feed water (Col. 3 line 24) to form surface active agents. U.S. Pat. No. 3,924,683 suggests conducting a steam soak process with "very small amounts" (Col. 1, line 41) of alkali, preferably from 0.05 to 0.6 percent (col. 2, line 62) added to the steam.

In addition, during the generation of steam in the field, the liquid effluent from the steam generator may have a high pH. This is because bicarbonate ions in the steam generator feedwater decompose to $CO_2$ and hydroxide ions. The $CO_2$ partitions into the vapor phase and the OH ions partition into the liquid phase thus raising the solution pH. The pH of liquid effluents from steam generators in the San Joaquin Valley have been reported to range from 10.8 to 11.6. It is therefore conceivable that, to some extent, in such steam soaks or steam drive processes in heavy-crude oil reservoirs, alkaline floods may be taking place. However, such alkaline floods have little if any effect since their alkalinity is largely confined to the small regions near the injectors; because of the high alkali consumption and the non-optimum conditions for an alkaline flood process.

SUMMARY OF THE INVENTION

The present invention relates to an improvement in a process in which steam and steam-foaming surfactant are injected into a subterranean reservoir for displacing a relatively acidic oil toward a production location. The injection of the steam is accompanied by or preceded by an injection of (a) a kind and amount of water-soluble alkaline material effective for ion-exchanging multivalent cations from the reservoir rocks, precipitating them into compounds which are insoluble in an aqueous alkaline liquid and causing the aqueous liquid phase of the injected fluid to form soaps of substantially all of the petroleum acids in the reservoir oil, and (b) at least one surfactant providing a surfactant capability for foaming steam and functioning as a cosurfactant for increasing the salinity requirement of an aqueous surfactant system in which soaps derived from the reservoir oil comprise primary surfactants.

DESCRIPTION OF THE DRAWING

The FIGURE shows a plot of compositions with amount of fluid flowed through a sandpack containing a typical reservoir sand formation.

DESCRIPTION OF THE INVENTION

Generally effective steam foam drive or steam soak processes are known. For example, U.S. Pat. No. 4,086,964 by R. E. Dilgren, G. J. Hirasaki, D. G. Whitten and H. J. Hill describes recovering oil by injecting a steam-foam-forming mixture through a steam channel which extends essentially between injection and production wells and U.S. Pat. No. 4,393,937 by R. E. Dilgren and K. B. Owens describes a similar steam-foam-forming mixture in which the surfactant is a particularly effective olefin sulfonate surfactant as well as methods of using such a mixture in steam drive or steam soak oil recovery process. The disclosures of these patents are incorporated herein by reference.

In a preferred embodiment of the present invention, the alkali-enhanced steam foam process consists of two phases. The first phase consists of injecting a preflood (or preflush) of alkali, at a relatively high concentration (e.g., equivalent to a $Na_2CO_3$ concentration of about 3 wt. % or above). Steam is also injected in this phase. The purpose is to ion-exchange the multivalent cations from the clays and precipitate the multivalent cations by alkali. If the reservoir already has a substantial steam chest, the preflood may be less effective because of gravity segregation. So, it may be desirable to inject a surfactant with the alkali and steam to form a steam foam to transport the alkali up into the steam zone. However, such a use of the surfactant in the preflood is optional, and may not be needed in a relatively thin reservoir. The alkali concentration in the preflood should, preferably, be higher than that in the continuous injection that follows.

The second phase consists of injecting an alkali, a steam foam surfactant (with or without NaCl), and steam continuously into the formation. But particularly toward the end of the process, both the surfactant and alkali concentrations can be decreased.

There are three main benefits of the presently proposed alkali-enhanced steam foam drive:

1. The adverse effect of multivalent cations on steam foam surfactant propagation is suppressed. This occurs because the water solubilities of carbonate or silicate, or the like, salts of multivalent ions such as calcium and magnesium are very low. Surfactant retention due to precipitation and partitioning are reduced.

2. Surfactant retention due to adsorption on the rock surface is reduced. The high pH generated by the alkali causes the clay surfaces to be more negatively charged thus reducing adsorption of the anionic steam foam surfactant.

3. The residual oil saturation is lowered due to a cosurfactant-enhanced alkali flood.

In addition, benefits (1) and (2) increase the rate of surfactant propagation and hence the rate of foam propagation. And, benefit (3) increases the displacement efficiency by lowering the residual oil saturation.

As indicated by the alkali transport problems discussed above, there are numerous mechanisms responsible for the consumption of bases in a subterranean earth formation. They include dissolution of quartz, dissolution of minerals such as gypsum and hydrite, or siderite, precipitation due to mixing with formation water, or ion-exchange, neutralization of hydrogen exchange sites on quartz or clay surfaces and transformation of clay minerals. And, in general, the consumption of alkali tends to increase with increase in reservoir temperature. However, the extent of the alkali consumption tends to be less with a carbonate (or other weak acid) buffered solution than with a carbonate-free solution of sodium hydroxide.

A coreflood was designed to study whether alkali could reduce surfactant losses due to adsorption and precipitation. The experiment was performed at 212° F. with a pack of sands obtained from the Bishop reservoir formation in Kern River, Calif. Before beginning the experiment, the sandpack was saturated with synthetic connate water which contained 0.0024 meq/g $CaCl_2$, 0.0008 meq/g $MgCl_2$, and 0.0168 meq/g NaCl. At this composition about 80% of the clays were in the calcium form. No oil was used.

First, the sandpack was flooded with 2.25 PV of 2.65 wt. % $Na_2CO_3$. This was followed by continuous injection of 0.5 wt. % Enordet ® AOS 1618 and 1 wt. % NaCl.

The FIGURE shows the effluent concentrations. Results can be summarized as follows: (1) The produced water was free of calcium after the connate water was displaced. This indicated that the calcium ions which were exchanged off the clays were precipitated by the carbonate. In the tested reservoir material, in the absence of alkali, a calcium peak of 2000 ppm was produced by flooding a comparable sandpack with the same surfactant formulation; (2) The surfactant front propagated at the same speed as the chloride front indicating that there was no precipitation and adsorption.

In another experiment, we studied the oil displacement efficiency of the alkali-enhanced steam foam drive (simulating the second phase of the present process). The experiment was carried out with an Ottawa sandpack with Bishop crude oil from Kern River, Calif. In the beginning of the experiment, the sandpack was steam driven to an oil saturation of 0.30 PV. We then injected 50% quality steam, nitrogen (0.006 mole fraction), 0.5 wt. % Enordet AOS 1618, 2.65 wt. % $Na_2CO_3$ and 1 wt. % NaCl. A steam foam was formed and all of the oil was produced. The residual oil saturation would have been ca. 0.10 PV for such a flood with a steam foam free of the alkali. Thus, the alkali-enhanced steam foam of the present invention can improve the displacement efficiency.

In the present process a kind and amount of water soluble alkaline material effective for causing precipitation of divalent cations and causing the aqueous liquid phase of the injected fluid to form soaps of substantially all of the petroleum acids in the reservoir oil, is injected along with or so as to become mixed with steam and steam-foaming surfactant. The alkaline material is preferably initially injected in a preflood in the form of a relatively concentrated aqueous solution, such as one equivalent to about 3 to 12 wt. % sodium carbonate solution and subsequently injected, continuously or intermittently, mixed with the steam being injected, in a concentration of less than about half the preflood concentration. Where the mixing is intermittent, alternate slugs of the alkaline liquid and steam are preferably sized in sequence so that they form a substantially homogeneous mixture before or soon after entering the reservoir formation. A preferred form of alkaline material comprises a solution of sodium carbonate or a mixture of it with sodium silicate. In general an alkali metal hydroxide mixed with an alkali metal salt of a weak acid, such as an alkali metal carbonate, bicarbonate, silicate, or the like, can be used. Such a solution preferably has a pH of from about 10 to 12, with the concentration of alkaline solute being sufficient to maintain the selected pH.

In the present process the aqueous alkaline solution formed by the mixing of the steam condensate and injected alkaline material should be arranged to provide an effectively low interfacial tension between the aqueous solution and the reservoir oil while at the same time providing a relatively high concentration of alkali which will be maintained throughout most of the reservoir. This can be accomplished by injecting components for forming such an aqueous alkaline solution in which the otherwise deleterious effects of a high electrolyte concentration are mitigated by the addition of a relatively small amount of preformed cosurfactant material. And, the kind and amount of such a material which is required for a given reservoir can be determined by tests which are feasibly inexpensive and accurate.

As known, when an aqueous alkaline solution contacts a crude oil which contains a significant amount of petroleum acids, surfactants are formed in situ. Such surfactants are, essentially, soaps of the petroleum acid components of the oil and are capable of producing a low interfacial tension between the oil and an aqueous solution. How low that interfacial tension will be is affected by factors inclusive of: the temperature to which the reservoir is heated by the injected steam, the kind and amount of petroleum acid components contained within the reservoir oil, the kind and concentration of alkali in the alkaline solution, the kind and amount of electrolytes dissolved in the injected alkaline solution, the kind and amount of electrolytes dissolved in the water in the reservoir, the properties of the reservoir oil, and the like, which are factors affecting the "salinity requirement" of the surfactant system formed within the reservoir.

A significant increase can be provided in the "salinity requirement" of a petroleum soap surfactant system formed within a reservoir. "Salinity requirement" refers to the concentration of dissolved electrolyte, inclusive of the excess alkali and the electrolyte which becomes dissolved while the aqueous solution is in the reservoir, which minimizes the interfacial tension between the reservoir oil and the surfactant system with which the oil is being contacted. The increase in salinity requirement can be provided by dissolving in the aqueous alkaline solution to be injected a preformed cosurfactant material which is more soluble in that solution, relative to the reservoir oil, than are the petroleum soaps formed from the reservoir oil. (In other words, a preformed cosurfactant material regarding which the solubility ratio based on solubility in the aqueous alkaline solution to solubility in the oil is greater for the preformed cosurfactant material than it is for the petroleum acid soaps.) For a typical reservoir oil, such an increase in the salinity requirement can make the salinity requirement equivalent to a concentration of alkali high enough to provide a satisfactory propagation rate of alkali through the reservoir.

In general, a preformed cosurfactant suited for use in the present invention is soluble in the aqueous alkaline solution formed by mixing the alkaline material with the condensate of the steam being injected into the reservoir, is an amphiphilic compound which is stable at the temperature of the injected steam and has a solubility in the alkali/brine solution relative to its solubility in the oil which is greater than the solubility of the petroleum soaps (derived from the reservoir oil) in the alkali/brine solution relative to their solubility in the oil. Suitable preformed cosurfactants comprise amphiphilic molecules in which the polar groups are sulfonates, alcohols, or the alkoxylated derivatives of amphiphilic molecules containing such polar groups. The non-polar parts of such amphiphilic molecules can be, but are not restricted to, aliphatic, aromatic or aliphatic-substituted aromatic hydrocarbon groups. Due to the low concentration of multivalent cations in aqueous alkaline solutions, amphiphilic molecules having more widely differing chemical structures may be useful as preformed surfactants in the present aqueous alkali solution than in conventional surfactant solutions, which have a substantially neutral pH. Particularly suitable preformed cosurfactants are typified by polyalkoxylated aliphatic or aromatic sulfonate or alcoholic surfactants inclusive of aromatic ether polysulfonates, such as the Dowfax aromatic ether polysulfonate surfactants described in U.S. Pat. No. 3,945,437 by Y. C. Chiu and H. J. Hill, amyl or isopropyl alcohol, alkyl or alkylarylpolyalkoxyalkylene sulfonates described in U.S. Pat. No. 4,269,271, Triton X-200 (sodium alkylarylpolyether sulfonate, from Rohm and Haas, Aerosol OT (dialkyl ester of sodium sulfosuccinic acid, from American Cyanamid), Enordet-AOS or IOS (alpha-olefin or internal olefin sulfonate surfactants, available from Shell Chemical Co.), petroleum acid soaps such as the sodium salt of Sunaptic Acid B (from Sun Chemical Co.), etc. Such surfactants having a tendency to form steam foams in the absence of the soaps derived from the reservoir oil acids are especially preferred.

The steam used in the present process preferably has a quality of from about 10 to 90 percent and preferably about 30 to 80 percent, at the time it enters the reservoir formation. In general, it can be generated as a dry, superheated or wet steam and subsequently mixed with aqueous liquid. The steam can be generated at surface, or downhole locations and mixed with aqueous solutions of the alkaline material and surfactant at surface or downhole locations. The mixing of the steam with noncondensible gas, surfactant, and electrolyte, in a manner similar to those described in U.S. Pat. Nos. 4,086,964 and 4,393,937, while using an electrolyte comprising an alkaline material, is a particularly preferred procedure.

The concentration of the preformed cosurfactant being injected with steam (based on the water equivalent of the injected fluid) can be less than or about equal to the surfactant concentration used in conventional steam-foam drive processes such as those described in the patents mentioned above. A preferred range of concentration is about 0.1 to 5.0 weight percent of the aqueous phase of the steam entering the reservoir.

In addition, as described in the U.S. Pat. Nos. 4,086,964 and 4,393,937 patents mentioned above, the steam-foaming surfactant can be substantially any which is capable of providing a steam foam permeability reduction factor lower than about 0.18. Numerous examples of such surfactants are listed in those patents. The alpha or internal olefin sulfonate surfactants, such as Enordet AOS 1618, are particularly suitable because of their capability of functioning as either or both the steam-foaming and preformed cosurfactant material.

What is claimed is:

1. In a process in which steam and steam-foaming surfactant are injected into a subterranean reservoir for displacing a relatively acidic oil toward a production location, an improvement comprising:

injecting into the reservoir, at least as soon as at least some portion of the steam is injected, (a) a kind and amount of water soluble, alkaline material effective for ion-exchanging multivalent ions from the reservoir rocks and precipitating compounds containing those ions and for causing the aqueous liquid phase of the injected fluid to form soaps of substantially all of the petroleum acids in the reservoir oil, and (b) at least one surfactant arranged for foaming the steam and providing a preformed cosurfactant material capable of increasing the salinity requirement of an aqueous surfactant system in which soaps derived from the reservoir oil comprise a primary surfactant.

2. The process of claim 1 in which part of said alkaline material is injected as a relatively concentrated aqueous solution before injecting the steam.

3. The process of claim 1 in which a portion of steam is injected so that it forms a steam zone within the reservoir, then at least one portion of said alkaline material is injected into the reservoir as a component of a relatively concentrated aqueous alkaline liquid mixed with steam and a preformed surfactant capable of functioning as said cosurfactant, and then, steam mixed with surfactant and preferably a lower concentration of alkali is injected into the reservoir to provide an alkaline steam foam displacement of oil.

4. The process of claim 1 in which said surfactant comprises an olefin sulfonate surfactant capable of providing both the steam foaming and cosurfactant operations.

5. The process of claim 4 in which said alkaline material is an alkali metal silicate or carbonate, or a mixture of both.

6. The process of claim 5 in which said salt is sodium carbonate.

7. The process of claim 1 in which oil is recovered by a steam-foam soak process.

8. The process of claim 1 in which oil is recovered by a steam-foam drive process.

9. The process of claim 1 in which aqueous alkaline material and preformed cosurfactant are injected into the reservoir in the form of a steam-foam-forming mixture comprising steam, noncondensible gas, a steam-foaming surfactant inclusive of said preformed cosurfactant and an electrolyte which consists essentially of said alkaline material.

* * * * *